Figure 1:
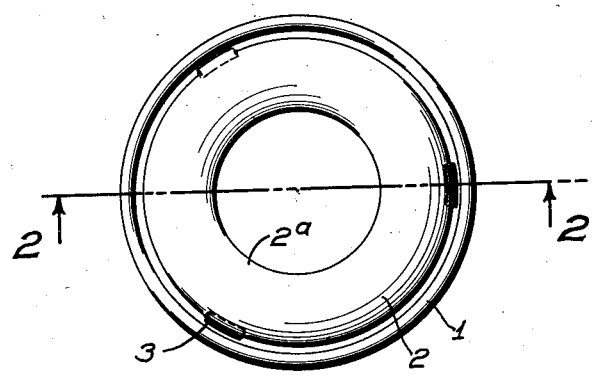

Dec. 17, 1929.  D. E. AUSTIN  1,739,627
ANTISPLASH DEVICE FOR DRINKING CUPS AND THE LIKE

Filed April 18, 1927

INVENTOR.
DWIGHT E. AUSTIN
BY A.B.Bowman
ATTORNEY

Patented Dec. 17, 1929

1,739,627

UNITED STATES PATENT OFFICE

DWIGHT E. AUSTIN, OF LOS ANGELES, CALIFORNIA

ANTISPLASH DEVICE FOR DRINKING CUPS AND THE LIKE

Application filed April 18, 1927. Serial No. 184,465.

My invention relates to a device for preventing the splashing and accidental spilling of the contents of drinking cups and other receptacles.

The objects of my invention are: first, to provide a device of this class which may be easily inserted and retained in a drinking cup, glass, or other receptacle to prevent, or reduce to a minimum the upward splashing of the contents thereof, and also to prevent the accidental spilling of said contents; second, to provide a device of this class which is particularly adapted to prevent splashing and spilling of the contents of drinking cups, or other receptacles while drinking or pouring the contents from the receptacle when riding on jarring, moving vehicles; third, to provide a device of this class consisting of an inverted cupped plate provided with resilient supporting legs or tongues, for supporting the device, within a drinking cup, glass, or other receptacle and in spaced relation with its inner wall, whereby the contents of the cup, glass, or other receptacle may readily flow therefrom between the inner wall of the receptacle and the periphery of the device, and also whereby the device, by reason of its cupped construction, will reduce to a minimum the splashing and accidental spilling of the contents of the cup, glass, or other receptacle when using the same on jarring, moving vehicles, such as trains, stages, buses, automobiles, or the like; fourth, to provide a device of this class which consists of an annular member supported within and in spaced relation to the inner wall of a drinking or other receptacle to prevent the splashing or accidental spilling of the contents thereof, said device being so constructed that the contents of the receptacle may be seen at all times, that the contents of the receptacle may be stirred when desired, and further that the contents of the receptacle may be readily replenished without removing the device from the receptacle; fifth, to provide a device of this class which may be applicable to receptacles of slightly different diameters by merely bending the supporting portions thereof inwardly or outwardly slightly; sixth, to provide as a whole a novelly constructed device of this class; and, seventh, to provide a device of this class which is very simple and economical of construction, durable, efficient, which may be readily applied and removed, and which will not readily deteriorate or get out of order.

Figure 2:
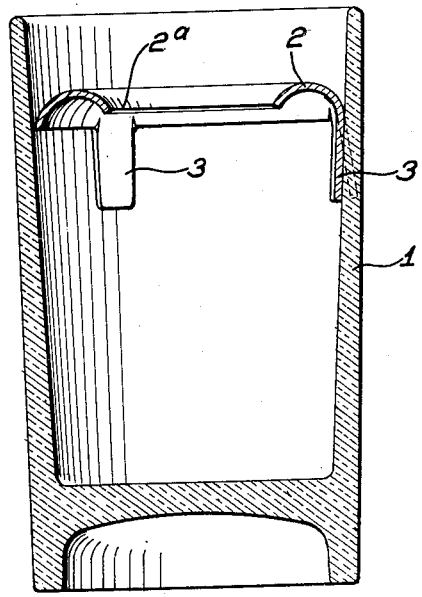

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a top view of an ordinary drinking glass, showing my device positioned therein, and Fig. 2 is a sectional elevational view thereof taken through 2—2 of Fig. 1.

Like characters of reference refer to similar parts and portions throughout the views of the drawings.

The receptacle, designated by 1 in the views of the drawings, may be either a drinking glass, as shown, a paper drinking cup, a porcelain tea or coffee cup, or any other receptacle for drinking, or any other larger open-end receptacles in which liquids are carried on moving vehicles.

My anti-splash device may be made of various materials, such as wax paper, or thin gage sheet metal. My device consists essentially of two parts, an annular member 2 and supporting legs, or tongues 3, there being preferably three such legs or tongues evenly distributed at the periphery of the annular member 2, as shown. The annular member is a ring-like plate concaved or cupped upwardly at its under side, substantially as the upper portion of a torus. The large central opening 2ª of the member 2 permits the contents of the receptacle to be seen at all times and also permits the contents to be stirred, if desired, such as when the device is used on a coffee or tea cup.

The legs, or tongues 3 are preferably made integrally with the member, or portion 2 and extend downwardly from the peripheral portion of the member 2, as shown. Said legs 3 are also preferably extended radially or outwardly slight distances from the periphery of the member 2 so that said member is spaced from the inner wall of the glass, or other receptacle. Said spacing is provided to permit the contents of the glass or receptacle to flow therefrom in small amounts. The legs 3 are preferably directed outwardly, as shown by dotted lines in Fig. 2, so that the device is resiliently and frictionally retained in position within the receptacle, and also so that the device may be used in connection with receptacles of slightly different inside diameters.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a device of the class described, the combination with a receptacle, of an annular member removably positioned within and at the open end of said receptacle, the middle portion of said annular member being open, and the under side of said member being cupped outwardly.

2. In a device of the class described, the combination with a receptacle, of an annular member having resilient supporting portions at its periphery, said portions extending downwardly at said periphery and slight distance beyond the periphery and adapted to engage the inner side of said receptacle and support the annular member in slight spaced relation at substantially its whole periphery relative to the inner wall of the slight receptacle.

3. In a device of the class described, the combination with a receptacle, of an upwardly cupped member adapted to be positioned within said receptacle at the open end thereof, said member having resilient supporting portions at its periphery adapted to engage the inner side of said receptacle for supporting said member therein and spacing the periphery slightly from the inner wall of the receptacle.

4. In a device of the class described, the combination with a receptacle, of a splash preventing plate of circular construction, said plate being provided at its periphery with a plurality of outwardly and downwardly directed resilient supporting portions adapted to engage the inner side of said receptacle and frictionally support said plate in slight spaced relation at its periphery relative to the receptacle.

5. In a device of the class described, the combination with a receptacle, of a splash-preventing member, said member having a plurality of resilient legs extending beyond the peripheral portion thereof and directed downwardly adapted frictionally to engage the inner side wall of the receptacle for supporting said member near the upper end of the receptacle with its periphery in slight spaced relation to the inner wall of the receptacle.

In testimony whereof, I have hereunto set my hand at Los Angeles, California, this 11th day of April, 1927.

DWIGHT E. AUSTIN.